United States Patent [19]

Leopold

[11] Patent Number: 4,993,067
[45] Date of Patent: Feb. 12, 1991

[54] SECURE SATELLITE OVER-THE-AIR REKEYING METHOD AND SYSTEM

[75] Inventor: Raymond J. Leopold, Chandler, Ariz.

[73] Assignee: Motorola, Inc., Schaumburg, Ill.

[21] Appl. No.: 289,948

[22] Filed: Dec. 27, 1988

[51] Int. Cl.$^5$ .......................... H04L 9/00; H04K 1/10
[52] U.S. Cl. ....................................... 380/21; 380/33; 340/825.34; 342/352
[58] Field of Search .................. 375/1; 380/21, 23, 25, 380/33, 52, 59; 340/825.3, 825.34; 244/175, 176, 189, 190; 342/352, 358, 359

[56] References Cited

U.S. PATENT DOCUMENTS 4,688,250  8/1987  Corrington et al. .................. 380/23
4,860,352  8/1989  Laurance et al. ..................... 380/23

Primary Examiner—Thomas H. Tarcza
Assistant Examiner—Linda J. Wallace
Attorney, Agent, or Firm—Frank J. Bogacz

[57] ABSTRACT

A secure satellite over-the-air rekeying method and system are shown. This system provides a geometric filter for allowing message input to a satellite from ground stations having a particular predefined geographic location. Messages transmitted from an allowable ground site having a proper location are received and processed. Messages from improper geographic ground stations are discarded by the system. The messages include over-the-air rekeying information. The secure satellite over-the-air rekeying method includes ground station transmissions to the satellite to be rekeyed. The satellite receives these transmissions from the ground station system. The satellite determines whether the geometric position of the ground station corresponds to a predetermined allowable position. If the position is an allowable one, the satellite system processes the received information and rekeys the satellite.

21 Claims, 5 Drawing Sheets

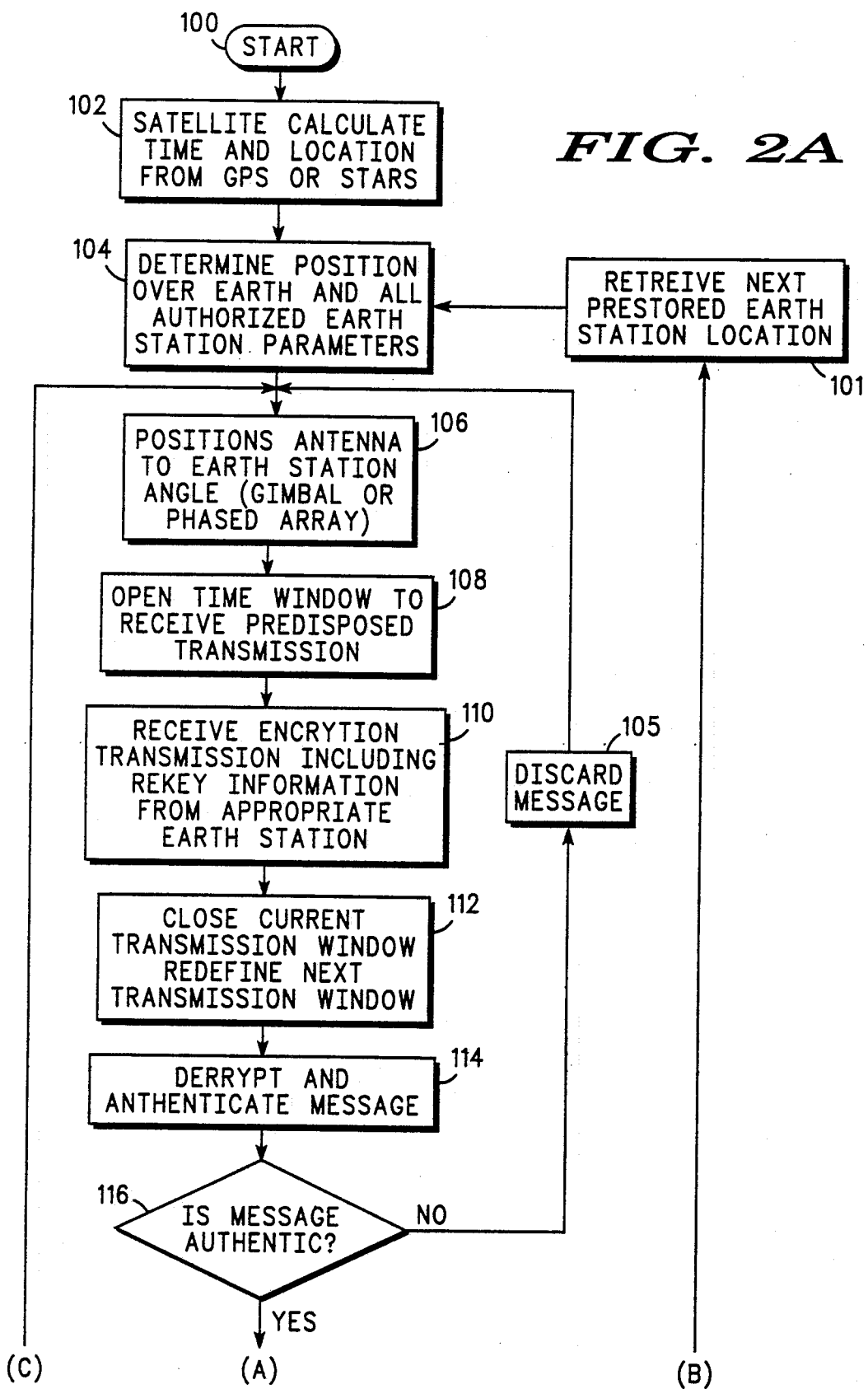

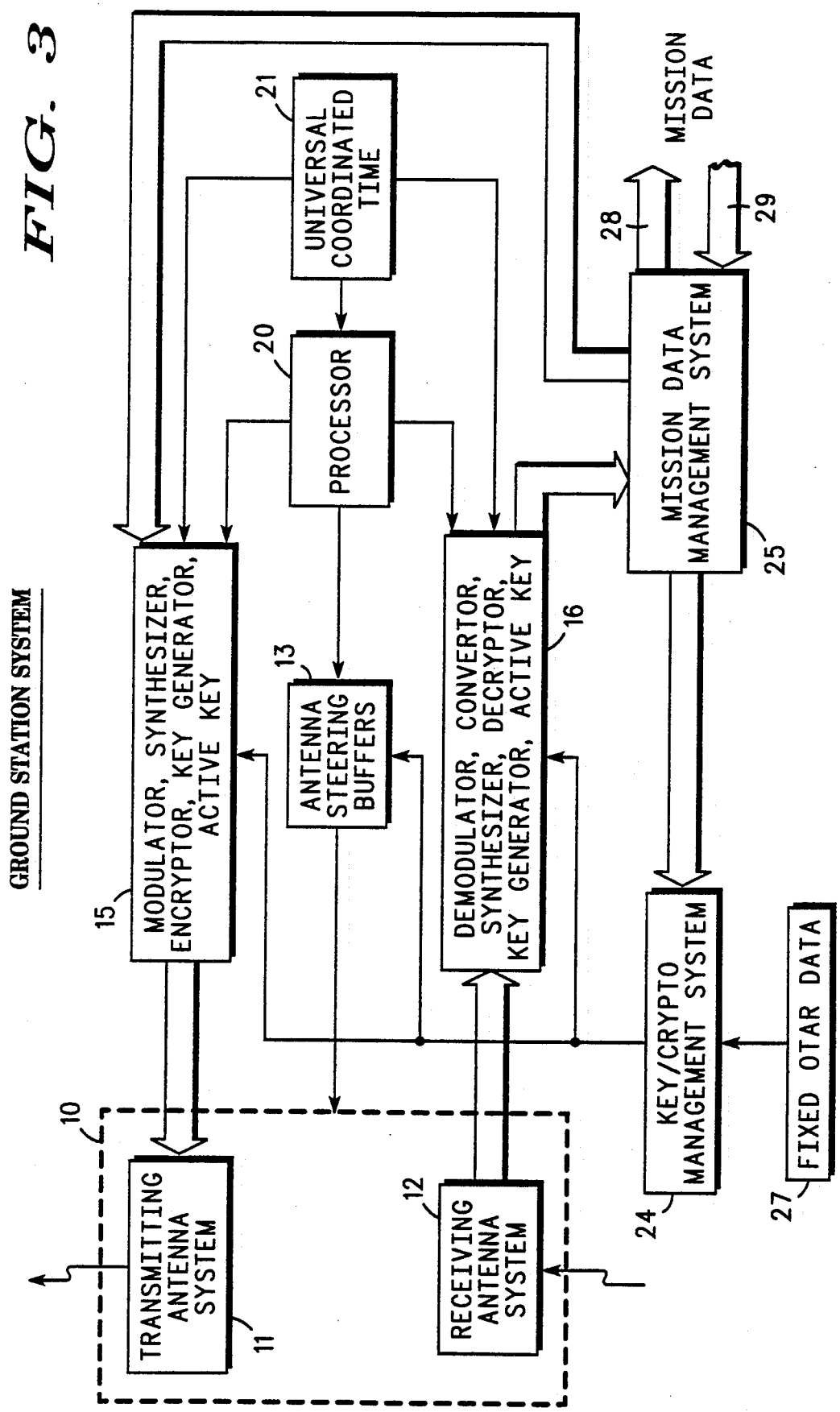

SECURE SATELLITE OVER-THE-AIR REKEYING METHOD AND SYSTEM

BACKGROUND OF THE INVENTION

The present invention pertains to secure satellite information transmission and more particularly to a method and system for over-the-air rekeying of a satellite.

A key is a piece of information which allows communication with a device such as a satellite. The longer one particular key is used for communicating with a satellite, the more susceptible that key is to being discovered and the satellite security compromised. Once discovered, unauthorized users may transmit information to the satellite. Therefore, it is necessary that this key information be periodically changed.

In addition, to the risk of being discovered, the key, if known to individuals, may be given to unauthorized users and, of course, the more people who know the key, the higher the probability of a human security breakdown. As a result, it is important to limit the human involvement in generating and distributing keys for accessing satellite communication links. If the keys are compromised, they must be changed or "rekeyed" on-board the satellite itself. Also, these keys should be changed on a periodic basis as a routine matter of security maintenance.

For expensive satellite programs employing a large number of satellites, the ability to change keys is especially important. The ways of rekeying large satellite systems are limited. Physical rekeying of such systems is impossible or at best impractical. Physical rekeying would entail either human or robotic contact with the satellite itself to input new keying information into the satellite.

A possible solution to this problem is to prestore multiple keys that are cued from a ground station or these prestored keys may be activated at particular times of the day or corresponding dates.

Another method for rekeying a satellite is to uplink new keys over existing or special, secure communication links. All of these solutions suffer from the shortcoming that they basically rely on frequencies, waveforms and codes that still fall into the category of information known by individuals which, if compromised, could be used by other unauthorized individuals. The human element eventually breaks down over time. If a satellite has a number of preprogrammed keys and all of these keys are compromised, the satellite must be reprogrammed (repaired in-orbit) or replaced. The cost of such reprogramming or replacement of vast satellite constellations of defense or commercial satellites is very great indeed.

Accordingly, it is an object of the present invention to provide a rekeying method and system for securely rekeying a satellite or other space platform based upon physical characteristics which are beyond human element breakdowns and which are as secure as a country's territory itself.

SUMMARY OF THE INVENTION

In accomplishing the object of the present invention, a novel, secure, satellite over-the-air rekeying method and system is shown.

For a secure satellite over-the-air rekeying method, one or more earth station system(s) transmits all or a part of the rekeying information over-the-air. The satellite to be rekeyed receives this transmission from the one or more preassigned ground station system(s). Next, the satellite determines whether the geometric position of the ground station corresponds to a predetermined allowable position on the surface of the earth. If the geometric position of the ground station system sending the message is an allowable one and if it occurs at a predetermined time, the satellite only then processes the signal to determine whether it has an acceptable format and only then accepts the new keying information. The new information is then used beginning at either a predetermined time or at a time encoded into the rekeying information. This method of rekeying does not replace existing rekeying concepts, but rather adds an additional layer of security.

BRIEF DESCRIPTION OF THE DRAWING

FIGS. 2A and 2B are a flow chart of the secure over-the-air rekeying method.

FIG. 3 is a block diagram of a ground station system of the secure over-the-air rekeying system.

DESCRIPTION OF THE PREFERRED EMBODIMENT

Figure 1:
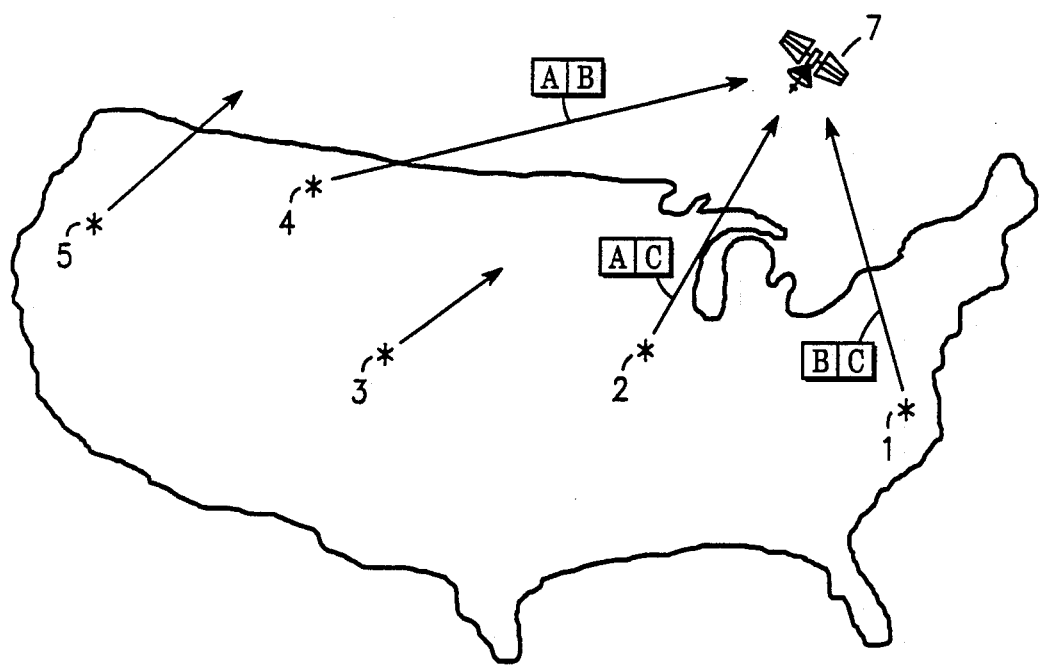
FIG. 1 is a diagram of a satellite over the U.S. in communication with a number of ground stations.

Referring to FIG. 1, a diagram of a spacecraft over the U.S. in communication with a number of ground stations is shown. Five ground stations (1-5) are shown although any number of ground stations may be selected for use in this system. Also, unauthorized ground stations (not shown) or authorized ground stations with bogus information (to confuse an adversary) may attempt satellite communications. The arrows from the ground stations to the satellite represent communications. As can be seen from FIG. 1, ground stations 1-4 are focused directly on the satellite. Ground station 5 is aimed such that its communication does not reach satellite 7.

The linchpin of the secure over-the-air satellite rekeying method and system is that each of the ground stations are located within a secured physical location of the U.S., for example. The basic security of this system is built into the location of the ground station within the secure territory of a particular country.

The ground stations 1-5 focus a narrowband RF signal upon the satellite 7 for transmitting a message to satellite 7 which includes rekeying information. Laser transmission equipment may also be employed in place of the RF transmission equipment and would likely allow a more narrow (more secure) beam. As a satellite passes over the U.S., it will have a unique geometric orientation relative to ground sites at a particular point in time. This is depicted in FIG. 1. At this particular point in time, preprogrammed into the satellite or cued by a previous message transmission, ground stations 1-5 execute message transmissions to satellite 7. For the present explanation of FIG. 1, it is assumed that the key to be transported to satellite 7 is equal to ABC.

As can be seen from FIG. 1, no one ground station has or transmits the complete key. Ground station 1 has two parts of the key. Those parts are B and C. Ground station 2 has two parts of the key, A and C. Ground station 4 has two parts of the key, A and B. This key information along with a message are simultaneously transmitted. Satellite 7 is preprogrammed to look for message transmission from particular angles on the earth during a time certain window. The key can be broken up in this manner to provide an extra measure of reliability and security. No one transmission carries the entire key and any one transmission can be lost without losing the keying information.

The transmission from ground station 5 is not preprogrammed into satellite 7. Therefore, it will appear that a transmission is coming to satellite 7 from the wrong angle (earth position). Let us assume that ground station 3 does not have the proper encryption key. Although the ground station 3 to satellite 7 path is at a correct angle (position on the earth), the encryption will not be properly deciphered. As a result, both the signals of ground stations 3 and 5 will be seen by satellite 7 as extraneous or bogus signals and discarded by the satellite 7. It is assumed that all ground station message transmissions are both secured by standard communications security (COMSEC), transmission security (TRANSEC), cryptosealing and authentication techniques.

When satellite 7 receives the message transmissions from ground stations 1, 2 and 4, these transmissions are properly encrypted and received at the proper angle. Therefore, satellite 7 knows to accept the key information received from these ground stations. However, for added security it is to be noted that no one ground station has transmitted all the key information. Satellite 7 then closes its time window for receiving transmissions. Since it is determined that each of the ground stations 1, 2 and 4 had a proper angle, the message including rekeying information will be processed. This processing includes decryption. Each of the ground stations 1, 2 and 4 will receive an acknowledgement message indicating that the satellite 7 has received the message and recognized that site as an allowable ground station.

Once all the rekeying information is deciphered, each portion of the rekeying information is extracted from the message transmitted by ground sites 1, 2 and 4. Portion A of the rekeying information may be obtained from either ground site 2 or 4. Similarly, B may be obtained from either ground site 1 or 4 and C may be obtained from ground station 1 or 2. The new key is then constructed from this information. At a particular time which may be preprogrammed or be part of the message itself, the satellite changes from its existing key to the new key recently calculated.

It is to be noted that modifications may be made to this concept, but the basic concept includes reliance upon the calculation by the satellite of a known geographic position on earth which the satellite recognizes as one within its own country. Some modifications that may be made are: having longer keys; having more stations simultaneously transmit to cover the identity of the allowable ground stations; having the satellite 7 receive portions of the new key on successive orbits. Many other variations to this scheme exist. This system could be launched with a single ground station transmitting the whole key and later grown into one with multiple, allowable ground stations and relatively long keys as a constellation of satellites evolves over time, satellites are replaced, requirements are stiffened, and performance needs to improve.

For the transmission between the ground stations and the satellite, spread spectrum techniques in the low EHF frequency band are useful. Angle detection by the satellite may be achieved with a multiple beam phased array, for both transmission and reception, with an angular resolution of less than one-half degree. The received antenna of the satellite may point in narrow multiple beams at the appropriate time. Wave forms defined in MILSTD 1592 may be used.

For added security, the satellite 7 may require the same key information to be received in more than one time window or different windows.

Figure 2B:
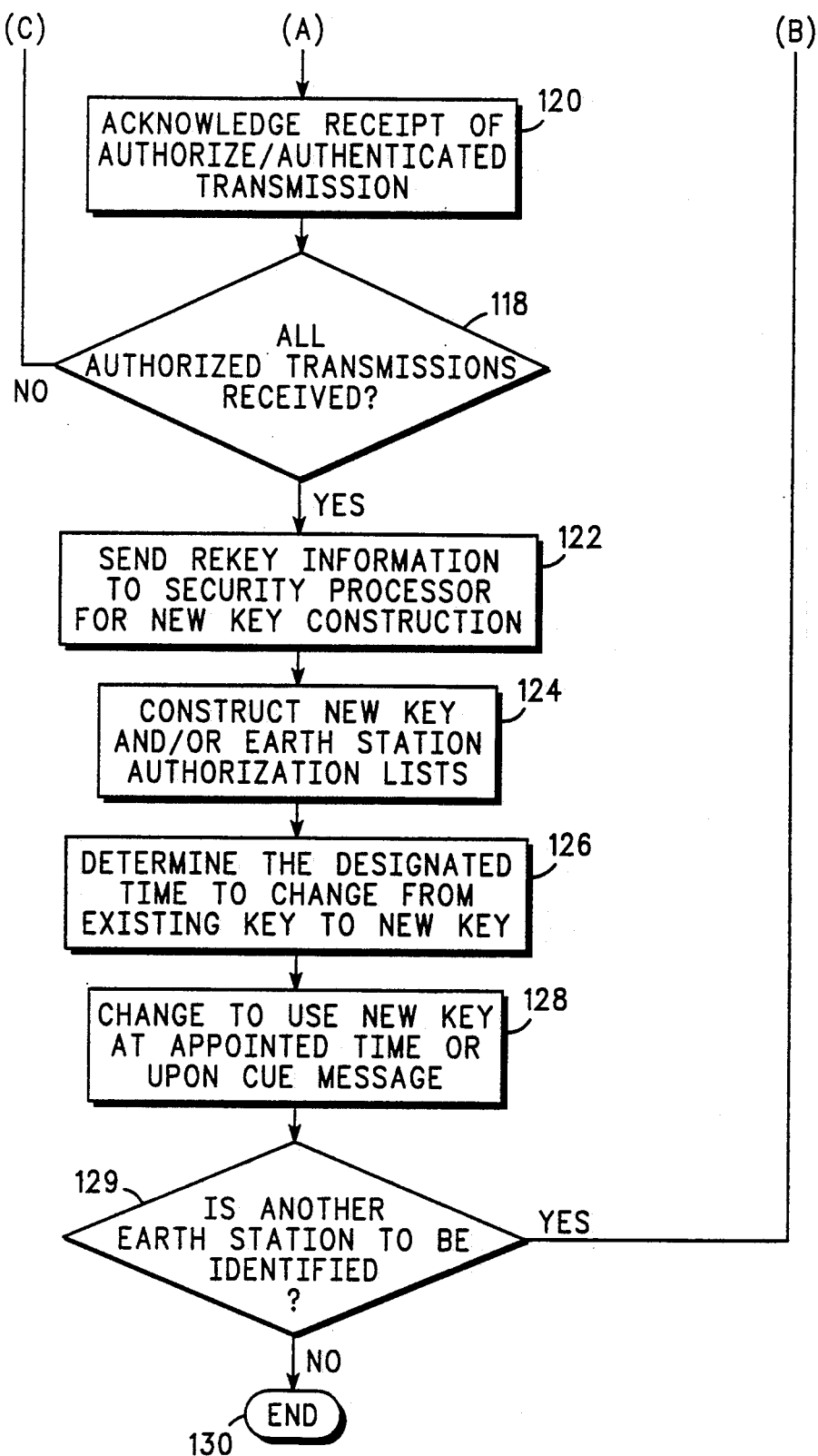

Referring to FIG. 2A and 2B collective, the secure over-the-air rekeying method is shown. Initially, block 100 is entered and the method is initiated. Prior to launch, the locations of the authorized ground station are loaded onto the satellite in non-reprogrammable memory, block 101. The satellite calculates its location and time from the GPS satellites or from basic astrological positions, block 102. Next, the satellite determines its position with respect to the authorized ground station(s) at the authorized transmission time, block 104. This defines the geometric position (angle) of the satellite to the authorized ground stations for the upcoming rekeying activity.

Prior to the opening of the receiving time window, the satellite adjusts its antenna system to receive the expected signal from the block 104 predetermined angle (geometric position), block 106. The time window is opened to receive the message, block 108. This message, which may include command information, data to be retransmitted and/or rekeying information, is received, demodulated and forwarded to the decryption system for further processing, block 110. Once the complete transmission is received, the receiving time window is closed denying further reception of any transmission, block 112. The transmission is decrypted and authenticated for validity, block 114.

Next, the satellite determines whether the transmitted data authenticates correctly, block 116. If the data does not authenticate correctly, the message is discarded, block 105, and the acquisition process is restarted, block 106. If the data authenticates correctly, an acknowledgement is sent back to the ground station, block 120, and the data is stored for further processing at a later time.

Next, the satellite determines whether it has received all of the data from all of the authorized ground stations, block 118. If all of the data has been received, this information is sent to the security processor which will construct the new key, block 122. If all of the data has not been received, the acquisition process is restarted for the next data transmission, block 106.

Once all of the rekey data has been received, the security processor constructs the new key, block 124. This may include a set of new geographic coordinates for a different set of ground stations. The security processor will also designate the exact time the system will convert to the new key and new set of ground stations, block 126. At the designated time determined by the security processor, the satellite is converted to the new key, block 128. The satellite system next determines whether the ground stations are changed also, block 129. If the ground station locations are changed, the new geographic locations are loaded into the ground station location memory, block 101. If the ground stations are not changed the process is completed, block 130. The system is now ready for the transmission of a new set of rekeying information.

FIG. 3 depicts a block diagram of the ground station system of the secure satellite over-the-air rekeying system. Messages are transmitted and received by antenna system 10. Antenna system 10 includes transmitting antenna system 11 and receiving antenna system 12. Transmitting antenna system 11 sends data to ground stations and receiving antenna system 12 receives data from ground stations.

Blocks 15 and 16 perform modulating/demodulating, converting, synthesizing, encrypting/decrypting, key generation and active key functions for the receiving and transmitting systems of the ground station. Blocks 15 and 16 are connected to the transmitting and receiving antenna systems 11 and 12, respectively. Blocks 15 and 16 are also connected to mission data management system 25, to processor 20 and to universal coordinated time function 21. Universal coordinated time function 21 is also connected to processor 20. KEY/CRYPTO management system 24 is connected to mission data management system 25 for receiving data. Mission data is input via leads 28 and 29. Block 27 is connected to block 24 and block 27 contains fixed over-the-air rekeying information which is transmitted to KEY/CRYPTO management system 24.

Mission specific data is loaded into mission data management system 25 via bus 29 and output data transmitted via bus 28. Block 27 stores the fixed over-the-air rekeying parameters and inputs these to KEY/CRYPTO system 24. KEY/CRYPTO system 24 provides for key storage and rekeying functions for the ground station system. KEY/CRYPTO management system 24 is connected to antenna buffer 13, to modulator/encryptor 15 and to demodulator/decryptor 16.

Universal coordinated time function 21 keeps the exact time and supplies it to processor 20, and to functions 15 and 16. Processor 20 controls the transmitting and receiving of data via the antenna speaker buffers 13 and functions 15 and 16. Function 15 modulates, synthesizes and encrypts outgoing data with the active key for transmission to the transmitting antenna system 11. Function 16 receives incoming messages from the receiving antenna system 12. Function 16 demodulates, converts, synthesizes and decrypts incoming data using the active key. Under control of processor 20, function 16 supplies this data to mission data management system 25. Mission data management system 25 then analyzes this data.

For transmissions received from the satellite, receiving antenna system 12 obtains the input and transfers it to function 16. Function 16 demodulates and converts this data. Function 16 then decrypts this data using the active key supplied by key management system 24. The results of this decrypting are then transferred from function 16 to mission data management system 25. Necessary parameters are obtained fixed over-the-air rekeying data 27. Mission data management system then performs any message analysis.

If a response or acknowledgement message is necessary, mission data management system 25 formulates the message. This acknowledgement message is then transmitted from mission data management system 25 to function 15. Function 15 modulates, synthesizes this data and encrypts it using the active key. Function 15 transmits this data to transmitting antenna system 11. Transmitting antenna system 11 broadcasts this information to the proper satellite.

Figure 4:
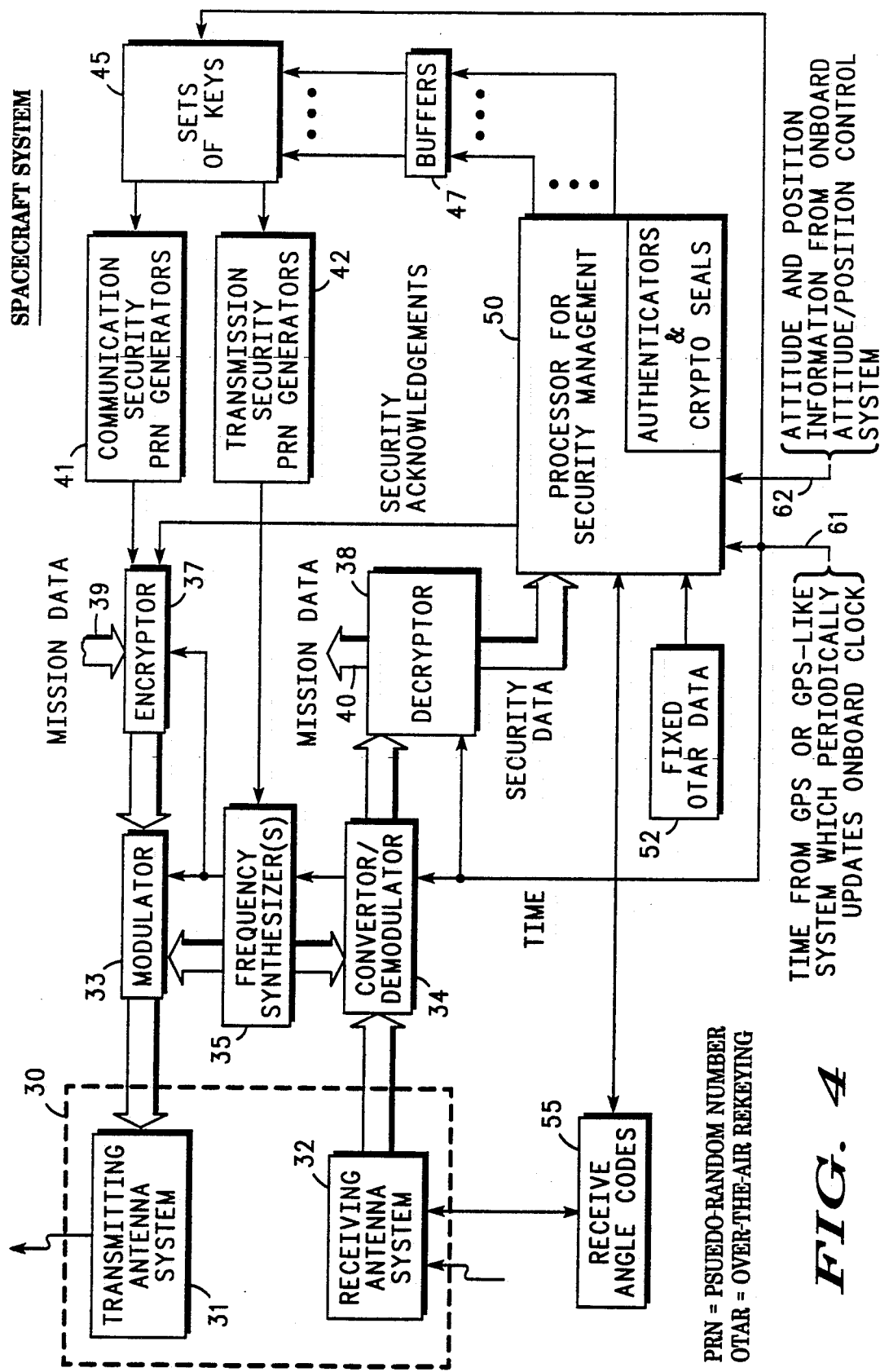
FIG. 4 is a block diagram of the spacecraft system of the secure over-the-air rekeying system.

Referring to FIG. 4, the spacecraft system for over-the-air rekeying system is shown. Antenna system 30 includes transmitting antenna system 31 and receiving antenna system 32. Transmitting antenna system 31 is connected to modulator 33 and receiving antenna system 32 is connected to converter/demodulator 34. Frequency synthesizer 35 is connected to modulator 33 and to converter/demodulator 34.

Encryptor 37 is connected to modulator 33. Decryptor 38 is connected to converter/demodulator 34. Mission data is input to encryptor 37 is accomplished via bus 39. Mission data is output from decryptor 38 via bus 40.

Decryptor 38 is connected to processor 50 via the security data bus. Encryptor 37 is connected to processor 50 via the security acknowledgements lead and to communication security (COMSEC) pseudo random number (PRN) generator 41. Transmission security (TRANSEC) pseudo random number (PRN) generator 42 is connected to frequency synthesizer 35. Sets of keys function 45 is connected to both the communication security pseudo random number generator 41 and to the transmission security pseudo random number generator 42. Buffers 47 are connected between sets of keys function 45 and processor 50. Fixed over-the-air rekeying data function 52 inputs fixed over-the-air rekeying information into processor 50.

The precise time is an input to processor 50 via lead 61. The time is obtained from a global positioning satellite, GPS, or from some other source of Universal Coordinated time. An onboard clock is periodically updated to contain the correct time. This correct time is input to processor modulator 33, converter/demodulator 34, encryptor 37, decryptor 38 and to sets of keys function 45 50 via lead 61. Attitude and position information are obtained from an onboard control system and input to processor 50 via lead 62.

Receive angle codes function 55 is connected between the receiving antenna system 32 and processor 50. Processor 50 with inputs via lead 62 determines its position relative to all transmitting ground stations for the receipt of messages transmissions. For purposes of rekeying, processor 50 loads the angle code for certain ground stations only into receive angle codes function 55. When receiving antenna system 32 obtains message transmissions from a ground station, it calculates the angle from which the message transmission emanated. Receiving antenna system 32 then compares this angle with the allowable angle codes stored in block 55. For message transmissions which have an allowable angle, receiving antenna system passes on the information to converter/demodulator 34. For those message transmissions which are not from one of the allowable angle codes, stored in block 55, receiving antenna system 32 simply inhibits these message transmission by not transmitting them to converter/demodulator 34. Thus, it may be said that the spacecraft system shown in FIG. 4 acts as a geometric filter, allowing those messages received from a correct ground station angle at the proper time window to be processed while discarding those from a nonallowable angle.

Decryptor 38 then decrypts the received message and transmits the security data to processor 50 for analysis. Processor 50 then performs the authentication of the message and obtains any rekeying information which is present in the message. For an acknowledgement message transmission, processor 50 formulates an acknowledgement message and transmits it to buffers 47. A message along with the keys to be used are obtained from sets of keys function 45. The transmission security key is input to the transmission security pseudo random number generator 42. The output of transmission security pseudo random number generator 42 controls the frequency synthesizer 35. The data along with its key is input to communication security pseudo random number generator 41. The output of communication security pseudo random number generator 41 along with the data is sent to encryptor 37. The data is encrypted with the appropriate key by encryptor 37 and transmitted to modulator 33. Modulator 33 changes the data to RF or laser beam compatible signals and transmits the data to transmitting antenna system 31. Transmitting antenna system 31 sends the data including any acknowledgement message to the appropriate ground station.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A secure satellite over-the-air rekeying method for rekeying a satellite via a message transmission between a ground station system and said satellite, said over-the-air rekeying method comprising the steps of:
   receiving said message transmission including rekeying data from said ground station system;
   determining by said satellite whether the geometric position of said ground station system corresponds to a predetermined allowable position with respect to said satellite; and
   processing said received message transmission including said rekeying data by said satellite, if said geometric position of said ground station system corresponded to a predetermined allowable location.

2. An over-the-air rekeying method as claimed in claim 1, wherein there is further included the step of positioning an antenna system of said satellite to said predetermined allowable location with respect to said ground station system to receive said message transmission.

3. An over-the-air rekeying method as claimed in claim 2, said step of positioning further including the step of calculating by the satellite the time of day and the positional location of the satellite from a geostationary body.

4. An over-the-air rekeying method as claimed in claim 3, said ground station system includes a plurality of ground stations, each said ground station including the step of transmitting a message transmission including said rekeying data to said satellite.

5. An over-the-air rekeying method as claimed in claim 4, said step of receiving including the steps of:
   opening a time window during which to receive message transmissions;
   receiving a plurality of message transmissions from a plurality of ground stations by said satellite; and
   closing said time window for receiving message transmissions by said satellite.

6. An over-the-air rekeying method as claimed in claim 5, wherein there is further included the step of iterating said steps of;
   receiving, determining, processing, positioning, calculating, transmitting, opening, receiving and closing for receiving a plurality of message transmissions.

7. An over-the-air rekeying method as claimed in claim 6, wherein there is further included the step of each ground station transmitting a message transmission which includes a portion of said rekeying data.

8. An over-the-air rekeying method as claimed in claim 7, wherein there is further included the step of simultaneously transmitting said message transmission including said rekeying data portions from said plurality of ground stations.

9. An over-the-air rekeying method as claimed in claim 8, wherein there is further included the step of repeatedly transmitting said message transmissions including said rekeying data by said plurality of ground stations on successive orbits of said satellite over said plurality of ground stations.

10. An over-the-air rekeying method as claimed in claim 8 wherein there is further included the steps of:
    decrypting each of said plurality of message transmissions from said allowable ground stations;
    second determining whether each message transmission is authentic;
    discarding said decrypted message transmission, if said decrypted message transmission is not authentic; and
    second iterating said steps of;
       receiving, determining, processing, positioning, calculating, transmitting, opening, receiving, closing, iterating, transmitting, simultaneously, transmitting, repeatedly transmitting, decrypting, second determining and discarding, if said decrypted message transmission is not authentic.

11. An over-the-air rekeying method as claimed in claim 10, wherein there is further included the step of acknowledging to each of said allowable ground stations that the satellite has received the message transmitted from the ground station.

12. An over-the-air rekeying method as claimed in claim 11, wherein said step of processing includes the steps of:
    finding each said portion of said rekeying data from said decrypted message transmissions of said allowable ground stations; and
    constructing a new key from said portions of said rekeying data.

13. An over-the-air rekeying method as claimed in claim 12, wherein said step of processing further includes the steps of:
    third determining by said satellite a time at which to change from an existing key to said new key; and
    changing by said satellite to use said new key at said particular time.

14. An over-the-air rekeying method as claimed in claim 13, wherein there is further included the steps of:
    third determining whether another earth station is to be identified for communication;
    retrieving location parameters of a next identified ground station for communication; and
    third iterating said steps of;
       receiving, determining, processing, positioning, calculating, transmitting, opening, receiving, closing, iterating, transmitting, simultaneously transmitting, repeatedly transmitting, decrypting, second determining, discarding, second iterating, acknowledging, finding, constructing, third determining by said satellite, changing, third determining whether another earth station is to be identified and retrieving for said plurality of ground stations.

15. An over-the-air rekeying method as claimed in claim 14, wherein there is further included the step of fourth iterating said steps of;

receiving, determining, processing, positioning, calculating, transmitting, opening, receiving, closing, iterating, transmitting, simultaneously transmitting, repeatedly transmitting, decrypting, second determining, discarding, second iterating, acknowledging, finding, constructing, third determining by said satellite, changing, third determining whether another earth station is to be identified, retrieving and third iterating for a plurality of satellites to be rekeyed.

16. A secure satellite over-the-air rekeying system for rekeying a satellite via message transmission between the ground station system and said satellite, said over-the-air rekeying system comprising:
ground station means for transmitting message transmissions including rekeying data;
satellite means for receiving said message transmissions said satellite means including:
geometric filter means receiving said message transmissions from at least one of a plurality of predefined allowable ground station means;
said geometric filter means including means for calculating the angle of said satellite with respect to each of said plurality of ground station means;
said geometric filter means further operating to inhibit receiving said message transmissions from any ground station means other than said plurality of predefined allowable ground station means; and
said rekeying system further comprising:
said satellite further operating in response to said received message transmissions from said allowable ground station means to construct a new key and to rekey said satellite means.

17. An over-the-air rekeying system as claimed in claim 16, said geometric filter means including means for storing an identity of said predefined ones of a plurality of ground station means.

18. An over-the-air rekeying system as claimed in claim 16, said geometric filter means further including:
means for receiving connected to said means for calculating, said means for receiving operating to receive said message transmissions from any said ground station means with an allowable angle with respect to said satellite means; and
said means for receiving further operating to inhibit receiving message transmissions from any ground station means having a nonallowable angle with respect to said satellite means.

19. An over-the-air rekeying system as claimed in claim 18, said satellite means for receiving including antenna system means for selectively receiving said message transmissions.

20. An over-the-air rekeying system as claimed in claim 19, said satellite means further including:
modulator/demodulator means connected to said antenna systems means, said modulator/demodulator means for changing said message transmissions from a first to a second format;
encryption/decryption means connected to said modulator/demodulator means, said encryption/decryption means for rendering said message transmissions of said first format coded or decoded; and
security means connected to said encryption/decryption means, said security means for processing each of said message transmissions.

21. An over-the-air rekeying system as claimed in claim 20, said ground station means including:
antenna system means for receiving and transmitting said message transmissions;
modulator/demodulator means connected to said antenna system means, said modulator/demodulator means for changing said message transmissions from a first to a second format;
encryption/decryption means connected to said modulator/demodulator means, said encryption/decryption means for rendering said message transmissions of said first format coded and decoded;
time calculation means for obtaining the precise time of day; and
data processor means coupled to said time means and to said encryption/decryption means, said data processor means operating to analyze and construct new keys from said message transmissions.

* * * * *